United States Patent

Spirig et al.

[11] Patent Number: 5,856,667
[45] Date of Patent: Jan. 5, 1999

[54] APPARATUS AND METHOD FOR DETECTION AND DEMODULATION OF AN INTENSITY-MODULATED RADIATION FIELD

[75] Inventors: Thomas Spirig, Weisslingen; Peter Seitz, Kuesnacht, both of Switzerland

[73] Assignee: Leica AG, Heerbrugg, Switzerland

[21] Appl. No.: 776,838

[22] PCT Filed: Oct. 28, 1995

[86] PCT No.: PCT/EP95/04235

§ 371 Date: Feb. 13, 1997

§ 102(e) Date: Feb. 13, 1997

[87] PCT Pub. No.: WO96/15626

PCT Pub. Date: May 23, 1996

[30] Foreign Application Priority Data

Nov. 14, 1994 [DE] Germany .......................... 44 40 613.4

[51] Int. Cl.[6] .................................................. H01J 40/14
[52] U.S. Cl. .................................. 250/208.1; 250/559.38
[58] Field of Search ................................ 250/208.1, 221, 250/223 B, 559.4, 559.38, 559.44; 356/222, 375; 396/121, 120, 79, 80; 340/555–557

[56] References Cited

FOREIGN PATENT DOCUMENTS 39 09 394  1/1992  Germany .

OTHER PUBLICATIONS

Povel, et al., "Charge–Coupled Device Image Sensor As A Demodulator In A 2–D Polarimeter With A Piezoelastic Modulator", *Applied Optics,* vol. 29(8):1186–1190, Mar. 1990.

*Primary Examiner*—Que Le
*Attorney, Agent, or Firm*—Foley & Lardner

[57] ABSTRACT

An imaging sensor (13) has a multiplicity of sensor elements (16). Each sensor element (16) has a light-sensitive zone (17) in which radiation is detected as a function of position. A multiplicity of storage cells (21) successively store charges detected in the light-sensitive zone (17) of each sensor element (16) in synchronism with a modulation signal which is produced by the radiation source. The imaging sensor (13) simultaneously detects and demodulates intensity-modulated radiation as a function of position. The invention makes it possible to determine a range of parameters for the object (11) being examined, thus ensuring that the object is accurately recorded for rangefinding purposes.

10 Claims, 3 Drawing Sheets

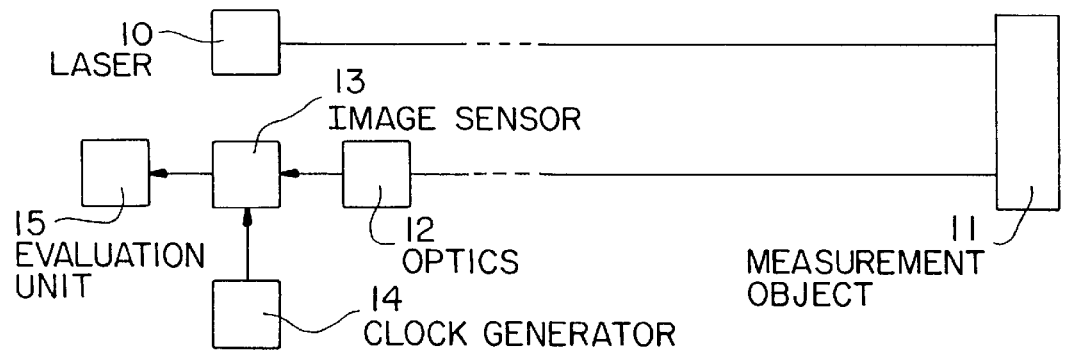
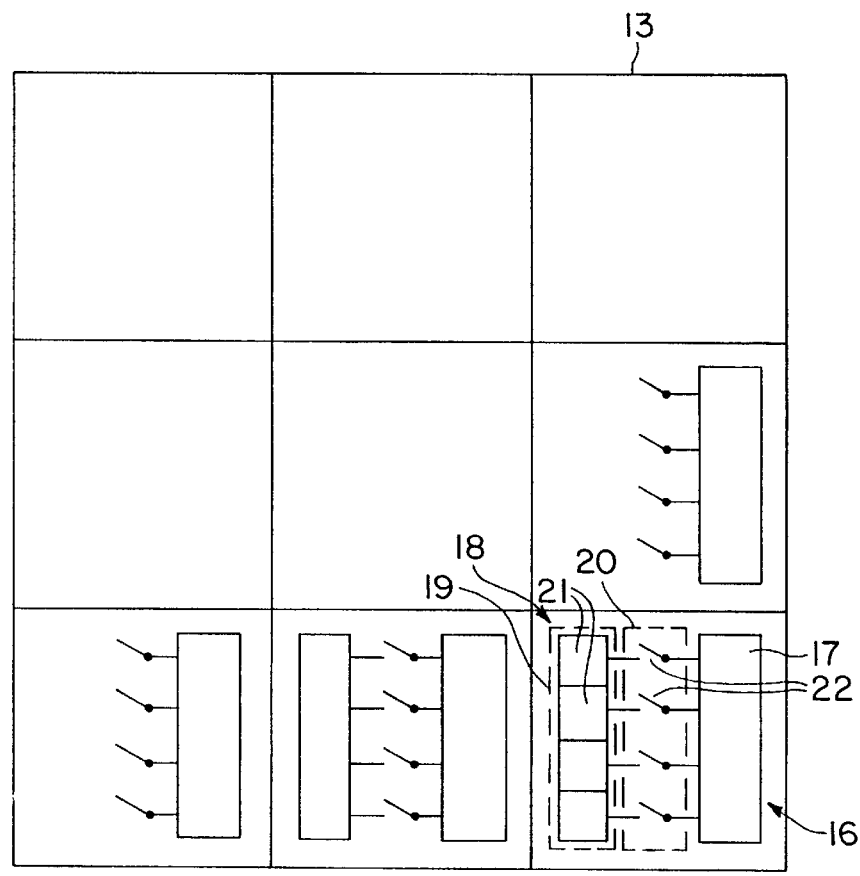

APPARATUS AND METHOD FOR DETECTION AND DEMODULATION OF AN INTENSITY-MODULATED RADIATION FIELD

BACKGROUND

The invention relates to an apparatus and a method for detection and demodulation of an intensity-modulated radiation field.

The behavior of many systems in technology is investigated, inter alia, with the aid of modulated signals. The system is in this case excited with a modulated signal, for example a sinusoidal signal, and the response of the system is measured. The modulation of the system response obtained, its phase shift with respect to the exciting signal, and the background signal level (offset) are defined as characteristic variables.

In the case of known semiconductor image sensors, two-dimensional distributions of the light intensity are converted into two-dimensional photoelectric current density distributions. The light-generated signal charges are integrated with respect to time in so-called pixels. For example, a CCD image sensor is disclosed in DE 39 09 394 C2, in which the charge pattern generated is shifted laterally during the exposure. This is intended to avoid the occurrence of movement blurring when recording objects which are moving relative to the image sensor.

A method is known for use in non-scanning, imaging laser-radar 3D cameras, in which modulated light is imaged on a conventional image sensor (Laser-Radar Imaging Without Scanners, Photonics Spectra, (28 Apr. 1994). The demodulation is carried out using an intensifier element, which receives images and is variable with respect to time, between the imaging objective and the semiconductor image sensor. The intensifier element is designed as a microchannel plate (MCP), it being necessary to operate at high voltages of 100 to 1000 volts. The incoming light is absorbed in the intensifier element, being modulated with respect to time, and then passes to the image sensor, the latter having only the function of an integrator. Three or more images can be recorded in this case, it being necessary to accept a considerable loss of light because of absorption in the intensifier element. In addition, the images must be read out of the image sensor completely between the recordings.

In addition, a CCD image sensor is known for the demodulation of time variable polarized light (H. Povel, H. Aebersold, J. O. Stenflo, "Charge-coupled device image sensor as a demodulator in a 2-D polarimeter with a piezoelastic modulator", Applied Optics, Vol. 29, pp. 1186–1190, 1990). A modulator is arranged between the objective and the CCD image sensor for this purpose, which modulator changes the polarization of the light between two states in rapid sequence. The two images produced of the two polarization states are accumulated and stored in the image sensor. A known image sensor is for this purpose provided with a strip mask, which covers every other image sensor line in a light-proof manner. In this way, the image of the respective polarization state can be accumulated in the correct cycle by shifting the image charge pattern up and down vertically.

SUMMARY OF THE INVENTION

An object of the present invention is to specify an apparatus and a method for detection and demodulation of an intensity-modulated radiation field, such that the determination of a plurality of parameters of the modulated radiation field is ensured.

The object is achieved by the features described herein.

The advantages achieved with the invention are, in particular, that an image sensor is provided which extends in one dimension or two dimensions and has a plurality of sensor elements which are in each case suitable on the one hand for detecting the modulated radiation and on the other hand for carrying out the demodulation thereof. A clock generator makes it possible for the demodulation which is carried out in the sensor elements in each case to be carried out in synchronism with the modulation signal which is transmitted from the radiation source, such that the parameters of the detected radiation field can be determined, as a function of position, once the measurements have been read out of the apparatus according to the invention.

The apparatus according to the invention preferably comprises a plurality of sensor units which extend in two dimensions. It can then advantageously be used for imaging interferometric measurement methods, time-modulated image signals being produced if the images are recorded using the heterodyne method. Moreover, the apparatus according to the invention may also comprise a single sensor element, such that measurements can be carried out point by point.

Each sensor element has at least one memory cell, which makes it possible to add up the charges detected in a light-sensitive part of the sensor element. This ensures the detection of low intensity signals.

According to a preferred embodiment, a sinusoidal radiation field is detected and demodulated. The amplitude, the phase and the background light on the radiation field can be determined using four samples per period. If the sampling rate is increased, other parameters of the detected radiation field can be obtained, such as the determination of Fourier coefficients, for example.

BRIEF DESCRIPTION OF THE DRAWINGS

Exemplary embodiments of the invention will be described in more detail in the following text with reference to the drawing, in which:

FIG. 1 shows a block diagram of the apparatus according to the invention,

FIG. 2 shows an illustration of the structure of the image sensor according to a first exemplary embodiment.

DETAILED DESCRIPTION OF EXEMPLARY EMBODIMENTS

Figure 3:
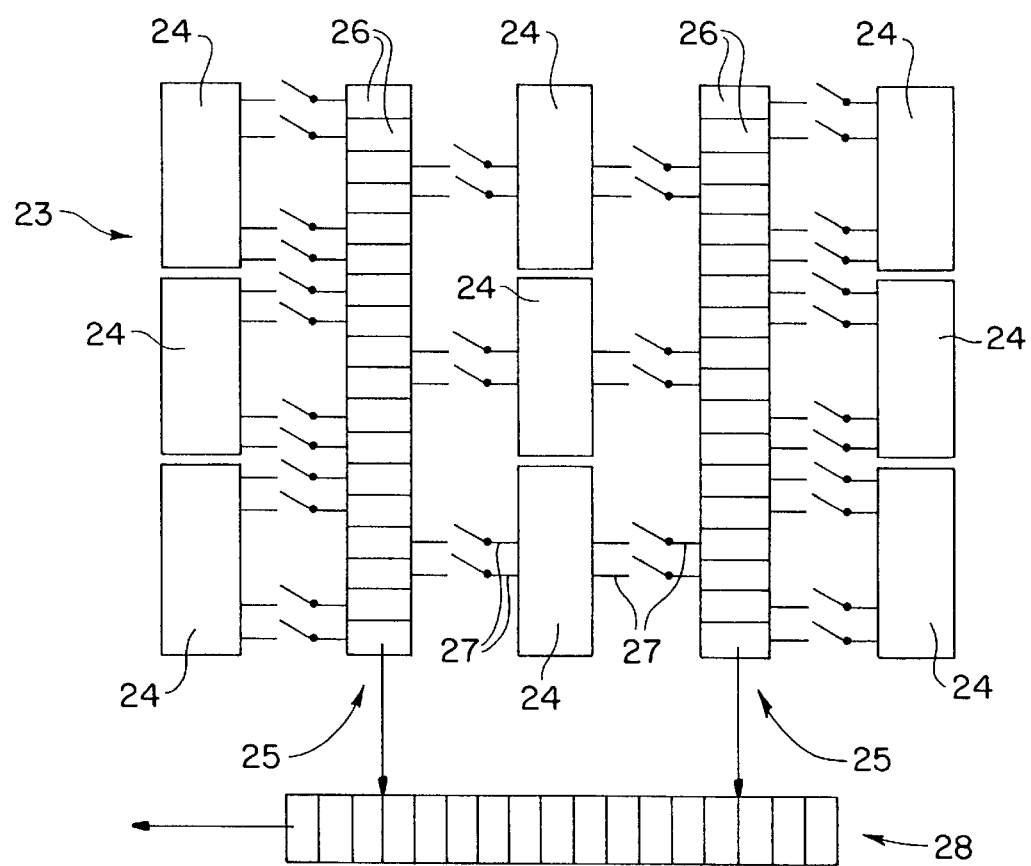
FIG. 3 shows an illustration of the structure of the image sensor according to a second exemplary embodiment.

The invention can advantageously be used for range measurement. The delay time of a modulated light pulse, which is transmitted from a radiation source, is reflected on the measurement object and is detected by the apparatus according to the invention, and can be defined by determining the phase difference of the modulated light. Furthermore, the invention offers the option of at the same time recording image information about the measurement object. Automatic sensor systems and robotics thus result as preferred fields of application of the invention.

The exemplary embodiments which are described in the following text are used to determine the phase, the peak value and the background light level of the detected radiation field. A laser 10, which is directed at a measurement object 11, is used as the radiation source for the transmission of a modulation signal (see FIG. 1). The radiation field which is reflected on the measurement object 11 is imaged, using conventional optics 12, on an image sensor 13 of the apparatus. A clock generator 14 is used to control the signals which are recorded in the image sensor 13 and, after detection and demodulation have been carried out in the image sensor 13, the image sensor 13 supplies them to an evaluation unit 15, in which the measurements are calculated and are passed on to a display unit, which is not illustrated.

In a first exemplary embodiment according to FIG. 2, the image sensor 13 comprises nine identically constructed sensor elements 16, which together form a 3×3 image sensor field. Each sensor element 16 comprises a light-sensitive part 17, on which the intensity-modulated radiation field occurs, and a number of signal charges are produced, corresponding to the intensity of the same. The light-sensitive part 17 of the sensor element 16 is designed as a photodiode. Alternatively, the light-sensitive part 17 can be designed as an MOS capacitor.

Furthermore, the sensor element 16 has a light-sensitive part 18, which comprises a memory area 19 and a switch area 20.

The memory area 19 and the switch area 20 each contain the same number of memory cells 21 and, respectively, electrical switches 22, the number of which corresponds to the number of integrations of the radiation carried out per period in the light-sensitive part 17. The memory cells 21 may each be designed as CCD pixels or CMOS capacitors. The electrical switches 22 are designed as transistor switches or as CCD gates.

The charges which are integrated in the light-sensitive part 17 are transferred to the memory area 19 by sequential actuation of the electrical switches 22. The electrical switches 22 are controlled by the clock generator 14 to this end in such a manner that the first switch 22 is closed at a specific time in order that the contents of the light-sensitive part 17 are stored in a first memory cell 21. Once the first switch has opened and a short, specified time interval has elapsed, the second switch 22 is closed, in order that the next quantity of charge integrated in the light-sensitive part 17 can be transferred to the second memory cell 21. This switching sequence continues until the last switch has been closed and opened again. After this, it is possible to begin passing the charges from the light-sensitive part 17 to the memory cells 21 from the start, the contents of the memory cells 21 in each case being added up in synchronism, in time, with the modulation signal which is transmitted by the laser 10.

Figure 4:
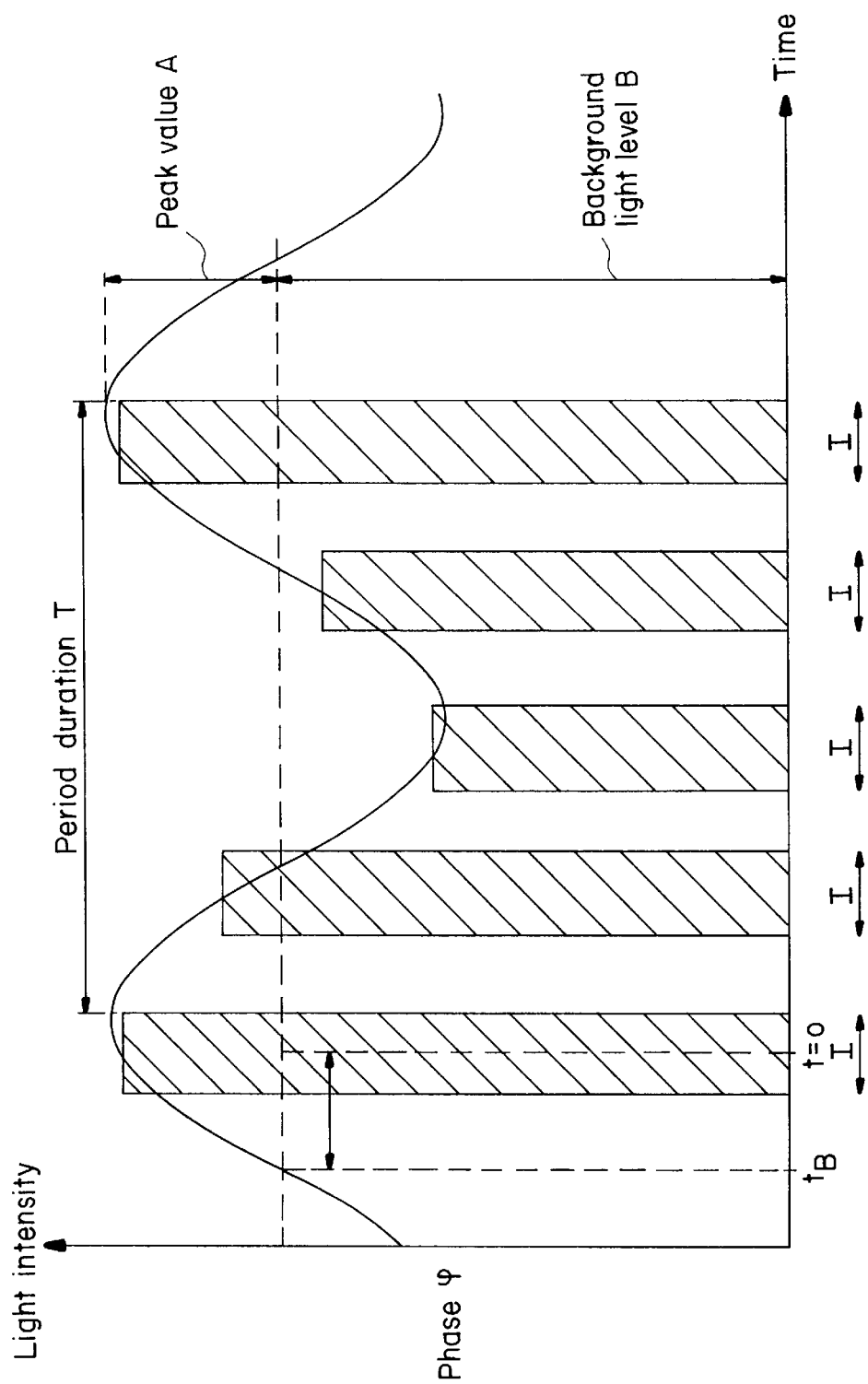
FIG. 4 shows a time profile of a detected, sinusoidal modulation signal.

According to FIG. 4, a sinusoidal radiation signal is detected. For this purpose, the charges are in each case integrated four times, within an integration interval I, in the light-sensitive part 17, within a period duration T of the radiation signal. The integration intervals are distributed equidistantly and at the same separations from one another. After the charge quantities have been transferred sequentially via the respectively associated switches 22 into the memory cells 21 and they have been added up in a repeated manner in the memory cells 21, the measurements, which are proportional to the charge, are passed on from the memory area into an evaluation unit 15, in which the parameters of the detected radiation signal are calculated.

As can be seen from FIG. 4, the following parameters are measured as a function of position. The phase difference Φ between the detected radiation signal and the transmitted modulation signal can be defined, so that the range to the measurement object 11 can be determined. The time $t_B$ of the peak value of the modulation signal is used as a time reference point. Furthermore, a peak value A and a background light level B can be defined from the demodulated radiation signal.

In a second exemplary embodiment according to FIG. 3, an image sensor 23 is designed exclusively using CCD technology. The image sensor 23 comprises a field of 3×3 reverse-biased MOS capacitors 24 as the light-sensitive part of the image sensor 23. Vertical CCD areas 25, which each comprise memory cells 26, are arranged between the light-sensitive MOS capacitors 24. In order to sample four charges per period, each light-sensitive MOS capacitor 24 is connected to four memory cells 26, via four transfer gates 27 as electrical switches. A clock generator, which is not illustrated, controls the passing of the signal charges from the MOS capacitors 24 into the vertical CCD areas 25 and, after this, the transfer of the signal charges from the vertical CCD areas 25 into a horizontal CCD area 28. The signal charges are supplied from there to an evaluation unit, in order to determine the measurements.

Alternatively, the CCD areas can also be designed in the form of circular arcs, the CCD areas each enclosing the MOS capacitors 24.

We claim:

1. An apparatus for detection and demodulation of an intensity-modulated radiation field produced by a radiation source, comprising:

(a) an image sensor comprising an arrangement of sensor elements arranged in at least one dimension, each sensor element having a light-sensitive part for converting a radiation signal into an electrical signal, and a light-insensitive part having at least one electrical switch and having at least one memory cell which is assigned to the switch; and (b) a clock generator for controlling the electrical switch in such a manner that signal charges which are produced in the light-sensitive part are passed through into the memory cell in synchronism with a modulation signal which is produced by the radiation source, and for controlling the memory cell such that signal changes which are stored in the memory cell are transferred into an evaluation unit for evaluation.

2. An apparatus according to claim 1, wherein the image sensor is of integral construction, and sensor elements are located directly along-side one another.

3. An apparatus according to claim 1, wherein the light-sensitive part of the sensor element is a photodiode or a MOS capacitor which is provided with a bias voltage.

4. An apparatus according to claim 1, wherein the memory cell is a MOS capacitor or a CCD pixel which is protected from light.

5. An apparatus according to claim 1, wherein memory cells form CCD areas in the form of straight-line CCD areas, from which stored measurements are transferred sequentially to the evaluation unit.

6. An apparatus according to claim 1, wherein memory cells are arranged alongside one another in such a manner that they form CCD areas in the form of circles.

7. An apparatus according to claim 1, wherein the switch is a transistor switch or a CCD transfer gate.

8. A method for detection and demodulation of an intensity-modulated radiation field produced by a radiation source, comprising the steps of:

(a) imaging the radiation field using optics onto an image sensor which comprises sensor elements which are arranged in at least one dimension;

(b) producing signal charges successively in a light-sensitive part of a sensor element corresponding to the intensity of the radiation field, the signal charges being integrated during an integration interval;

(c) transferring respectively integrated signal charges into a light-insensitive part of the sensor element in synchronism with a modulation signal which is produced by the radiation source, and storing the signal changes in a memory cell, the signal charges which are produced in the light-sensitive part being sequentially supplied from the light-sensitive part of the sensor element via at least one electrical switch which is assigned to a memory cell to a corresponding memory cell and stored; and (d) reading out signal charges which are stored in memory cells successively for measurement and supplying read-out signal charges to an evaluation unit.

9. A method according to claim 8, wherein an object is illuminated with a periodic or pulsed modulation signal, which is produced by the radiation source, and the object is imaged two-dimensionally on the image sensor as an intensity-modulated radiation field such that information is present about the form and/or structure of the object.

10. A method according to claim 8, wherein the signal charges are added up periodically in the memory cells.

* * * * *